US011163064B1

(12) United States Patent
Knights et al.

(10) Patent No.: US 11,163,064 B1
(45) Date of Patent: Nov. 2, 2021

(54) DOPPLER IMAGER

(71) Applicant: Palo Alto Research Center Incorporated, Palo Alto, CA (US)

(72) Inventors: John Knights, Seaside, CA (US); Alex Hegyi, San Francisco, CA (US); Peter Kiesel, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/927,550

(22) Filed: Jul. 13, 2020

(51) Int. Cl.
*G01S 17/894* (2020.01)
*G01S 7/481* (2006.01)
*G01S 17/58* (2006.01)

(52) U.S. Cl.
CPC .......... *G01S 17/894* (2020.01); *G01S 7/4816* (2013.01); *G01S 17/58* (2013.01)

(58) Field of Classification Search
CPC .. G01J 3/28; G01J 3/26; G01J 3/2803; G01N 21/25; G01N 21/255; G01N 21/645; G01N 21/05; G01N 2021/0346; G02B 21/16; G02B 27/46; G01S 17/89; G01S 17/894; G01S 17/58
See application file for complete search history.

(56) References Cited

U.S. PATENT DOCUMENTS

| 7,310,153 | B2 | 12/2007 | Kiesel et al. |
| 2011/0222062 | A1* | 9/2011 | Martini .............. G01J 3/28 356/417 |
| 2019/0187704 | A1 | 6/2019 | Gordon et al. |
| 2019/0285753 | A1 | 9/2019 | Spruit et al. |
| 2020/0057151 | A1* | 2/2020 | Finkelstein .......... G01S 17/894 |

FOREIGN PATENT DOCUMENTS

WO 2017/025885 2/2017

* cited by examiner

*Primary Examiner* — Luke D Ratcliffe
(74) *Attorney, Agent, or Firm* — Mueting Raasch Group

(57) ABSTRACT

A system comprises an imaging device that includes a two dimensional array of pixels. Each pixel of the array includes a first optical filter having a first pass band arranged to filter excitation light reflected by a moving object and a first detector configured to detect light transmitted through the first optical filter and to generate a first electrical signal. Each pixel of the array also includes a second optical filter having a second pass band arranged to filter excitation light reflected by a moving object and a second detector configured to detect light transmitted through the second optical filter and to generate a second electrical signal. The imaging device further includes circuitry that generates output signals from each of the pixels based on the first electrical signal and the second electrical signal of the pixel. The output signal includes information about the speed and direction of the moving object.

14 Claims, 9 Drawing Sheets

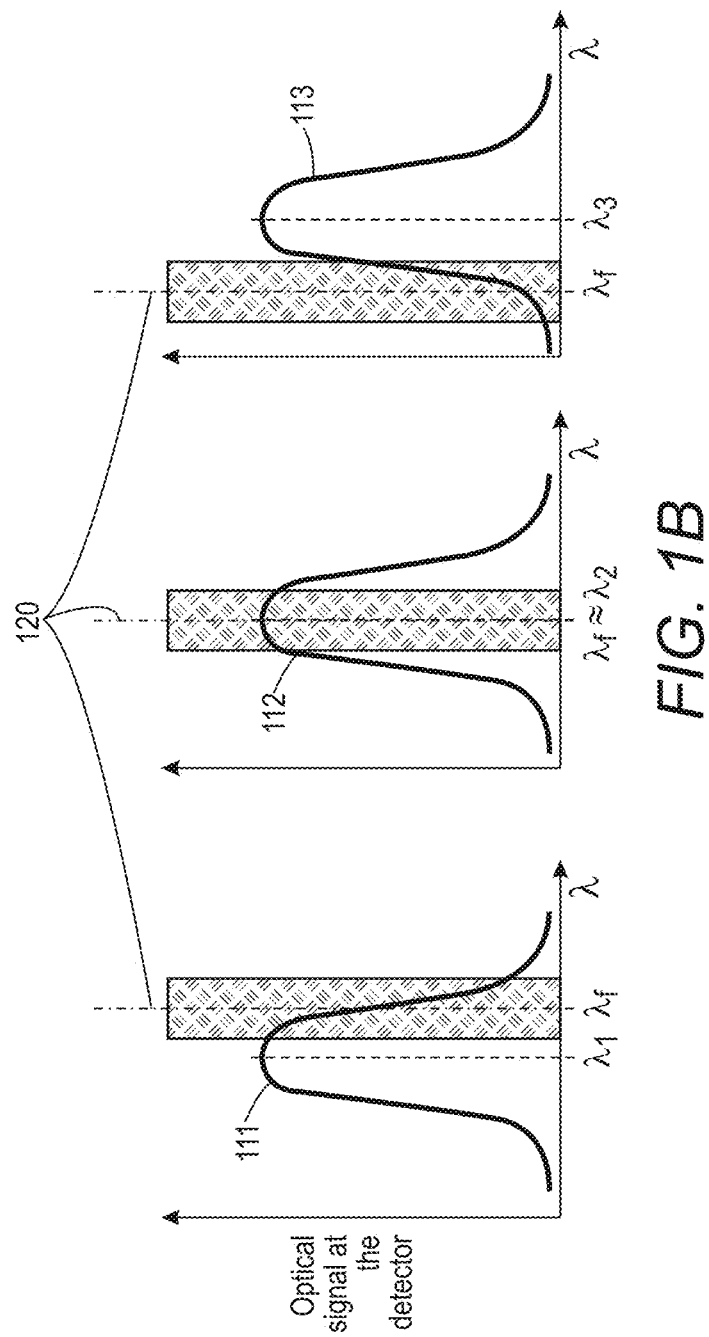

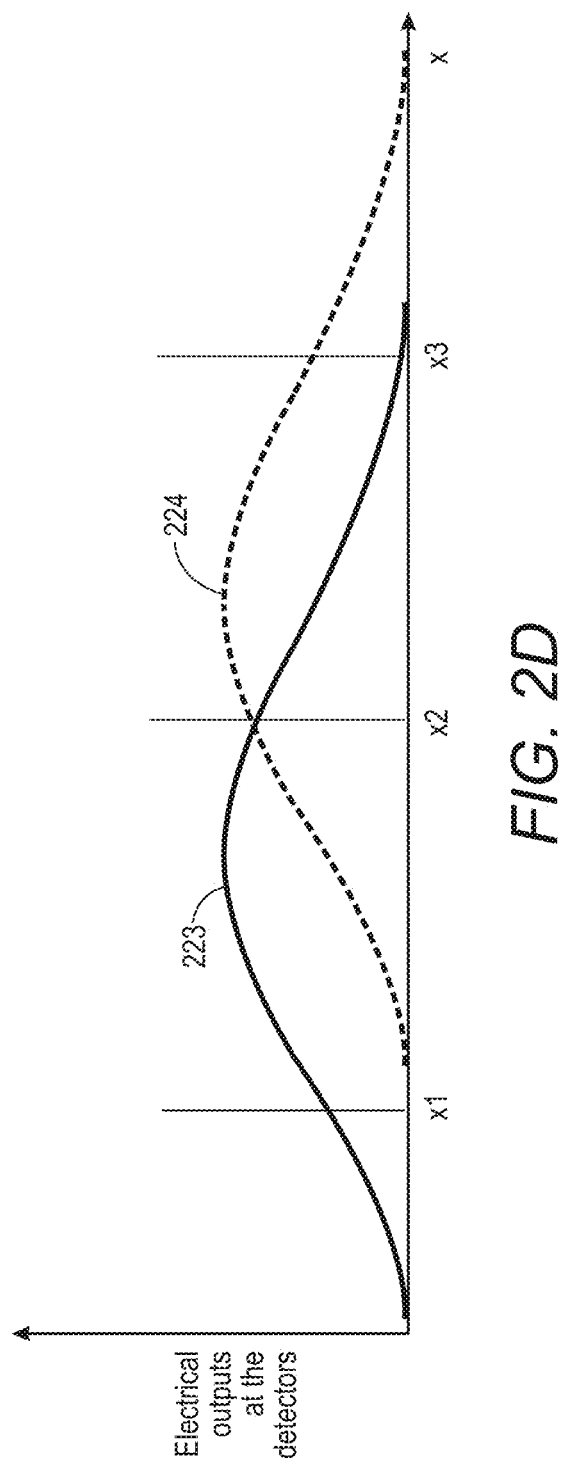

DOPPLER IMAGER

BACKGROUND

Doppler shift is the change in frequency of a wave in relation to an observer who is moving relative to the wave source. For example, sound waves exhibit Doppler shift that causes a change in pitch when a train engine approaches and then moves past an observer. Doppler shift occurs because when the source of the waves is moving towards the observer, each successive wave crest is emitted from a position closer to the observer than the crest of the previous wave. Each successive wave takes less time to reach the observer than the previous wave and the time between the arrivals of successive wave crests at the observer is reduced, causing an increase in the frequency. Conversely, if the source of waves is moving away from the observer, each wave is emitted from a position farther from the observer than the previous wave, so the arrival time between successive waves is increased, reducing the frequency.

Light waves also undergo Doppler shift. When an object moves away from an observer, the light reflected by the object is shifted to the red end of the spectrum, as its wavelengths get longer. If an object moves closer to the observer, the light moves to the blue end of the spectrum, as its wavelengths get shorter.

BRIEF SUMMARY

Some embodiments are directed to a system comprising an imaging device that includes two dimensional array of pixels. Each pixel of the array includes a first optical filter having a first pass band arranged to filter excitation light reflected by a moving object and a first detector configured to detect light transmitted through the first optical filter. Each pixel of the array also includes a second optical filter having a second pass band arranged to filter excitation light reflected by a moving object and a second detector configured to detect light transmitted through the second optical filter. The pass band of the first optical filter is different from the pass band of the second optical filter. The first detector generates a signal proportional to an overlap of the pass band of the first optical filter and the spectrum of the excitation light. The second detector generates a signal proportional to an overlap of the pass band of the second optical filter and the spectrum of the excitation light. The imaging device further includes circuitry configured to generate output signals from the pixels. The output signal for each pixel is based on the first electrical signal and the second electrical signal of the pixel. The output signal includes information about speed and direction of the moving object.

According to some embodiments an integrated imaging device includes pixels disposed on a substrate. Each of the pixels includes a first optical filter having a first pass band arranged to filter excitation light reflected by a moving object and a first detector configured to detect light transmitted through the first optical filter. Each pixel of the array also includes a second optical filter having a second pass band arranged to filter excitation light reflected by a moving object and a second detector configured to detect light transmitted through the second optical filter. The pass band of the first optical filter is different form the passband of the second optical filter. The first detector generates a signal proportional to an overlap of the passband of the first optical filter and the spectrum of the excitation light. The second detector generates a signal proportional to an overlap of the passband of the second optical filter and the spectrum of the excitation light.

Some embodiments are directed to an imaging method. Excitation light reflected by a moving object is optically filtered using at least one first optical filter having a first pass band. Light transmitted through the first optical filter is sensed and at least one first electrical signal is generated having an amplitude proportional to an overlap between a spectrum of the excitation light with the first pass band Excitation light reflected by a moving object is optically filtered using at least one second optical filter having a second pass band that is different from the first pass band. Light transmitted through the second optical filter is sensed and at least one second electrical signal is generated having an amplitude proportional to an overlap between a spectrum of the excitation light with the second pass band. At least one electrical output signal is generated based on the first signal and the second signal. The speed and/or direction of the moving object can be determined based on the output signal.

BRIEF DESCRIPTION OF DRAWINGS

FIGS. 1A through 1C illustrate the operation of a single pixel Doppler detector comprising a narrow band filter and light detector in accordance with some embodiments;

FIGS. 2A through 2D illustrate the structure and operation of a multi-pixel Doppler imaging system in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

The approaches described herein could be useful in any situation where parts of an imaged scene are moving relative to other parts and there is value in getting precise imagewise data about the relative speeds and directions of movement. Examples of specific applications include sensors for autonomous vehicles and security cameras, but there are many others e.g. monitoring production lines, sorting of recycled materials etc. Previous approaches to address these applications involve technologies such as light detection and ranging (LIDAR) combined with Doppler sensing using radar which can be quite expensive and bulky. The disclosed approaches reduce cost and size of legacy systems.

The embodiments discussed herein involve a Doppler imager that relies on a narrow optical bandpass filter positioned in front of a light sensor. The light sensor responds to a narrow spectrum optical source whose wavelength in shifting over a range comparable to or larger than the full width half maximum (FWHM) of the pass band of the optical filter. In response to a wavelength shift of the narrow spectrum optical source, the light sensor generates a signal having an amplitude that is proportional to the overlap between the spectrum of the illuminating source with the pass band of the filter.

According to embodiments discussed herein a device comprising a two dimensional (2D) array of image elements is exposed to an image from a scene or object illuminated by a wavelength stable narrow band source. In response to light reflected by the object, the image elements generate electrical signals that represent the image. The electrical signals are modulated by any wavelength shift generated by the Doppler effect from motion of the object imaged onto the sensor array. Depending on the magnitude of the wavelength shift and the pass band of the filter, the modulation could be 100% of the static image intensity.

Regarding the approach outlined above, there are several challenges from the standpoint of image analysis. The first is that the reflectivity of different objects at the wavelength of the illumination source will probably vary widely, so the amplitude of the signal from any given pixel will be a combination of the wavelength shift effect and the natural intensity of the reflected light from that portion of the image. The second challenge is that the direction of relative motion cannot be determined from a single image since movement in any direction away from the stationary position will result in amplitude shifts but the direction of motion also needs to be obtained. Various embodiments disclosed herein reduce the uncertainty with respect to reflectivity and/or provide information about both the magnitude and direction of relative motion between the detector and the object.

Figure 1A:
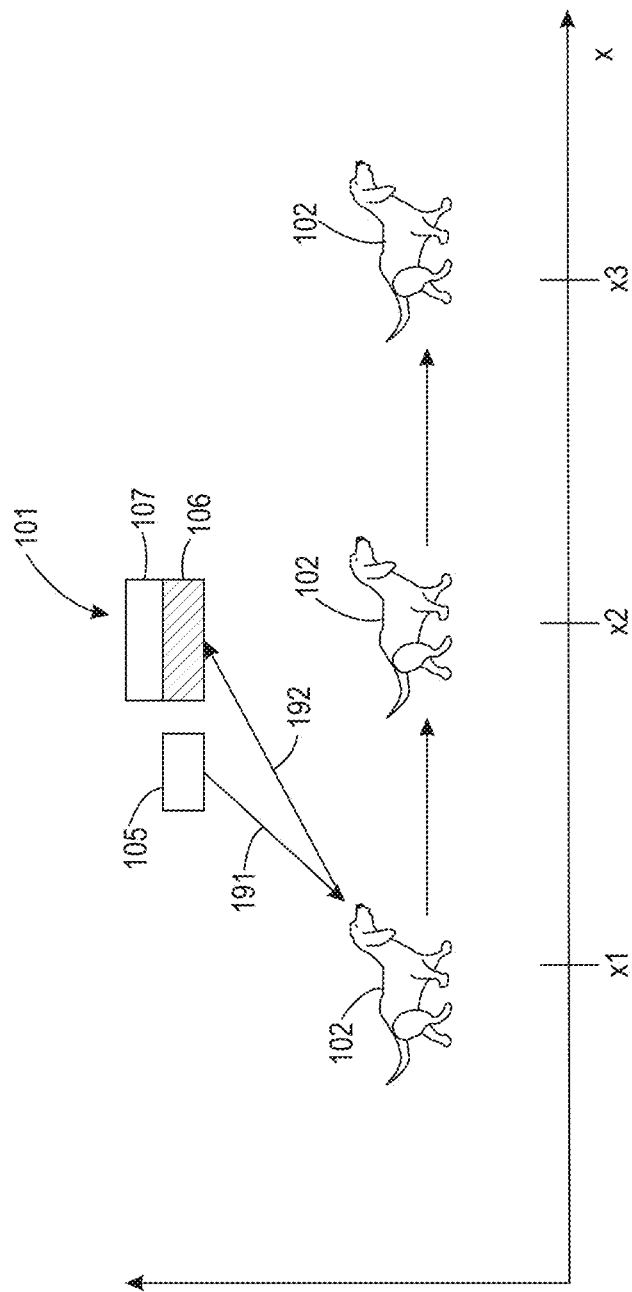
Figure 1C:
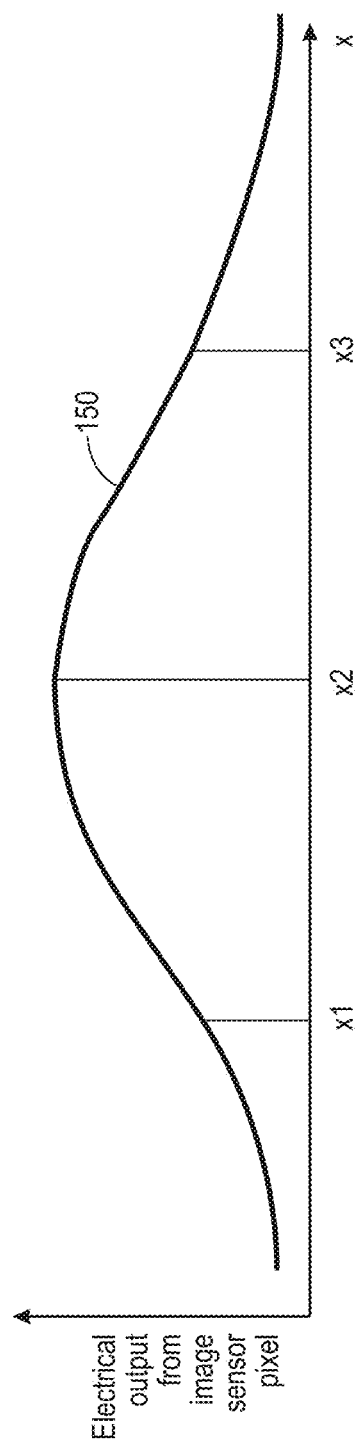

FIGS. 1A through 1C illustrate the operation of a single pixel Doppler detector 101 comprising a narrow band filter 106 and detector 107 in accordance with some embodiments. FIG. 1A shows an object 102 that moves at constant velocity along the x axis from left to right. The object 102 moves toward the detector 101, past the position $x_1$, moves next to the detector 101 at position $x_2$, and then moves away from the detector 101 past the position $x_3$. Narrow band excitation light 191 from source 105 is reflected by an object 102. The reflected light 192 interacts with filter 106 and is sensed by detector 107. When the object is stationary, the reflected spectrum sensed by the detector 101 has a central wavelength of $\lambda_0$. The narrow pass band 120 of filter 106 has a central wavelength $\lambda_f$. In this particular example, $\lambda_0 = \lambda_f$. In other scenarios, $\lambda_0 \neq \lambda_f$.

FIG. 1B shows the spectra 111, 112, 113 of the optical signal 192 that is reflected by the moving object 102 and received at the detector 101. The spectra 111, 112, 113 are superimposed on the pass band 120 of the narrow band filter 106. Between positions $x_1$ and $x_2$, the object 102 is moving toward the detector 101. As the object passes position $x_1$, the central wavelength $\lambda_1$ of the reflected spectrum 111 is shifted to a shorter wavelength relative to wavelength $\lambda_0$ (and the wavelength $\lambda_f$) due to Doppler blueshift. When the position of the object 102 is identical to the position of the detector 101 at $x_2$ the object is effectively at rest and the central wavelength $\lambda_2$ of the reflected spectrum 112 is equal to the stationary central wavelength, $\lambda_0$. Between positions $x_2$ and $x_3$, the object 102 is moving away from the detector 101. As the object 102 moves from position $x_2$ toward position $x_3$, the central wavelength $\lambda_3$ of the reflected spectrum 113 is shifted to a longer wavelength relative to the central wavelength $\lambda_0$ due to Doppler redshift.

FIG. 1C shows the electrical output 150 of the detector 101 as the object 102 moves along the x axis at constant velocity from left to right. At time $t_1$, the object 102 is at position $x_1$; at time $t_2$, the object 102 is at position $x_2$, and; at time $t_3$, the object 102 is at position $x_3$. The electrical output 150 of the detector 101 is relatively low at position $x_1$ because the overlap of filter pass band 120 and the reflected light spectrum 111 is relatively low. As the object 102 continues moving and is closer to the detector 101, the Doppler blueshift decreases, the overlap of the filter pass band 120 with the reflected spectrum increases, and the signal 150 increases. The overlap between the reflected spectrum and the pass band reaches a maximum when the object 102 is at position $x_2$, corresponding to a maximum amplitude in signal 150. As the object 102 moves away from the detector 101 toward position $x_3$, the Doppler redshift increases, the overlap of the filter pass band 120 with the reflected spectrum decreases, and the amplitude of signal 150 decreases. The velocity of the object 102 can be obtained by determining the rate of change in the increase or decrease of the signal 150.

One characteristic of the operation of the single pixel detector 101 illustrated by FIGS. 1A through 1C is that the signal 150 of the detector 101 can be used to determine the velocity of the object relative to the detector 101. However, the signal 150 does not include information about the direction of motion of the object 102. For example, signal 150 is the same at $x_1$ as the object 102 moves toward the detector 101 as it is at position $x_3$ as the object 102 moves away from the detector 101.

The criterion for this imaging modality to be useful is that the Doppler shift of the objects being imaged needs to be in a range detectable by the filter/narrow-band light source combination. One mile per hour corresponds to a Doppler induced wavelength shift of approximately 1.5 parts in one billion. At, for example a laser wavelength of 1.5 microns, the wavelength shift is therefore $1.5 \times 10^{-6}$ multiplied by $1.5 \times 10^{-9}$ which is $2.25 \times 10^{-15}$ meters or 2.25 femtometers (fm).

Embodiments discussed herein employ a monochromatic (laser) source coupled with sharp-edged filters. For example, for an edge filter that rolls off over 2 nm, a 2 fm wavelength change is 1 part per million. To detect such a change, assuming shot noise as the limitation to sensitivity, $10^{12}$ photons must be detected. Assume a sensing configuration comprising a 10 cm aperture at a standoff distance of 10 m; if photons scatter isotropically from the target, $1.6 \times 10^{17}$ photons should scatter from an area of the target corresponding to one detector element allowing collection of $10^{12}$ photons at the detector element (assuming 100% quantum efficiency). If the field of view of a 10×10 detector array is $(20 \text{ deg})^2$, this yields a spatial resolution at 10 m of about 35 cm. A laser source positioned at the detector would need to emit 2 Watts over a period of 1 second, distributed over the area corresponding to the field of view. Some assumptions have been made with regard to the reflectivity and scattering profile of the target as well as the collection and quantum efficiencies of the detector, however it should be noted that it is possible to make a very steep edge filter, and if the steepness is increased by 10×, the number of photons that need to be detected decreases by 100×.

FIGS. 2A through 2D illustrate the structure and operation of a multi-pixel Doppler imaging system 200 in accordance with some embodiments. A light source 205, such as a laser, emits narrow band excitation light 291 toward an object 202. The object 202 reflects light 292 toward a Doppler imager 201 comprising an array of pixels 220. Each pixel 220 includes two optical filter/detectors 221, 222. As best seen in the side cross sectional diagram of FIG. 2B, a first filter/detector 221 of a pixel 220 comprises a first filter 206 and a first detector 208. A second filter/detector 222 of the pixel 220 comprises a second filter 207 and a second detector 209.

The first filter 206 has a narrow pass band 216, e.g., a pass band of about 0.1 nm, with a central wavelength $\lambda_{f1}$. The second filter 207 has a narrow pass band 217, e.g., a pass band of about 0.1 nm, with a central wavelength $\lambda_{f2}$, wherein $\lambda_{f1} \neq \lambda_{f2}$. In some embodiments a full width half maximum (FWHM) of one or both of the first and second optical filters 206, 207 is less than a FWHM of the spectrum of the excitation light 291.

Figure 2A:
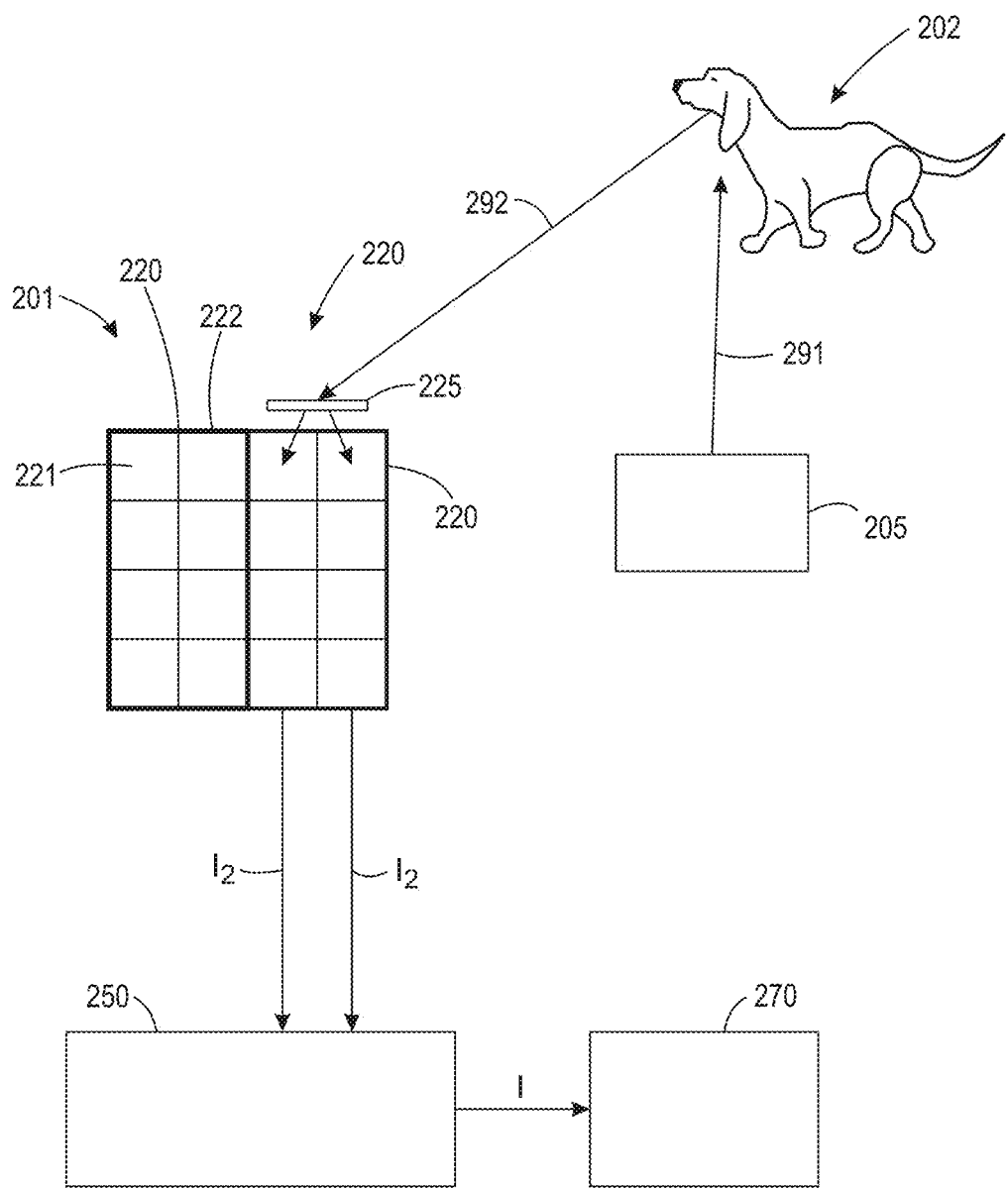

The first and second filters 206, 207 are arranged to filter excitation light 292 reflected by the moving object 202. As illustrated in FIG. 2A, in some embodiments, a beamsplitter 225 delivers the reflected excitation light 292 to each of the filter/detectors 221, 222. A first detector 208 is arranged to detect reflected excitation light 292 transmitted through the first filter 206. In response to the filtered reflected excitation light, the first detector 208 generates a first electrical signal, $I_1$, having an amplitude proportional to an overlap between the spectrum 211, 212, 213 of the reflected excitation light 292 with the first pass band 216. A second detector 209 is arranged to detect reflected excitation light 292 transmitted through the second filter 207. In response to the filtered reflected excitation light, the second detector 209 generates a second electrical signal, $I_2$, having an amplitude proportional to an overlap between a spectrum of the reflected excitation light 292 with the second pass band 217.

Returning now to FIG. 2A, readout circuitry 250 receives the first and second electrical signals. In some embodiments, the readout circuitry 250 may configured to normalize a difference between the first and second signals to a sum of the first and second signals. As discussed in more detail below, normalization of the two signals is useful to determine both velocity and direction of motion of the object. Normalization can also significantly decrease the effect of amplitude fluctuations of the laser source. The normalized result, I, can be expressed as:

$$I = \frac{(I_1 - I_2)}{(I_1 + I_2)},$$

The readout circuitry 250 can optionally perform a number of other functions, including amplification, normalization, pixel addressing, analog to digital conversion and other signal processing functions. The system 200 may include a processor 270 configured to receive and further process the normalized signal.

Figure 2B:
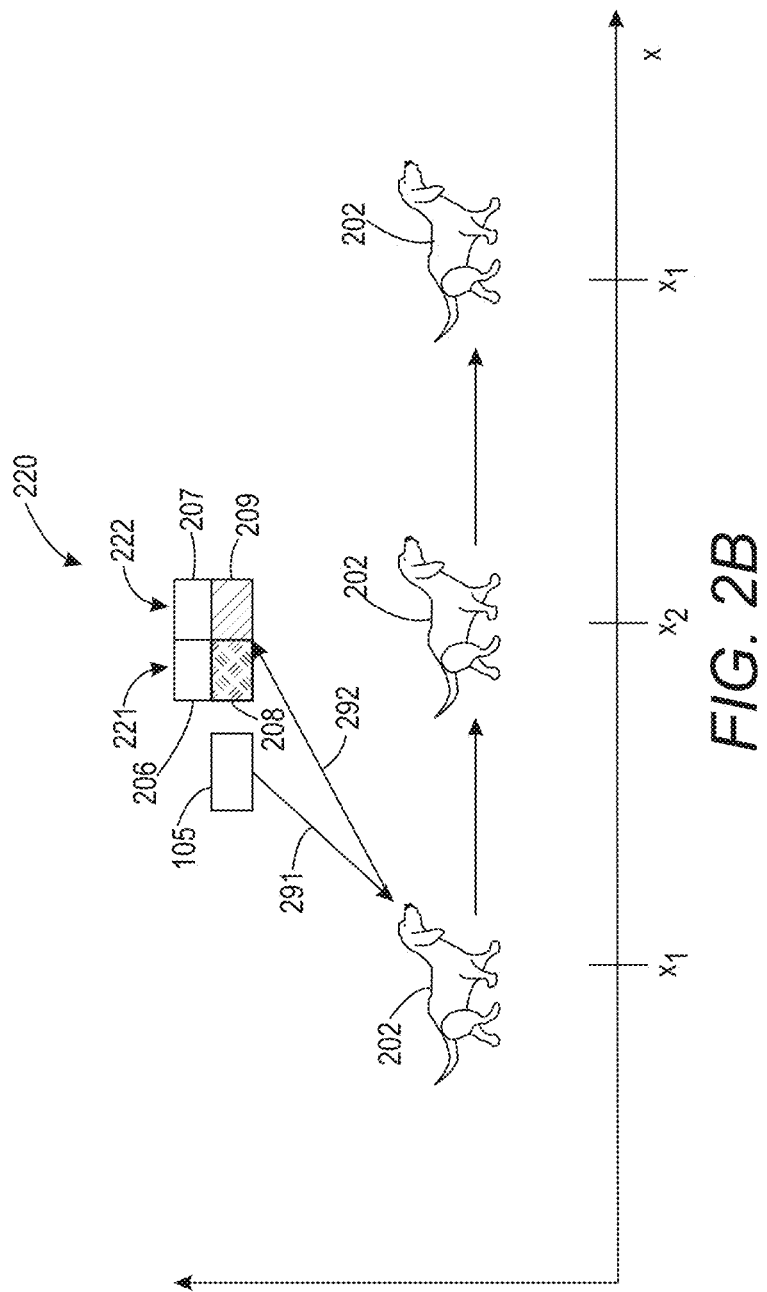
Figure 2C:
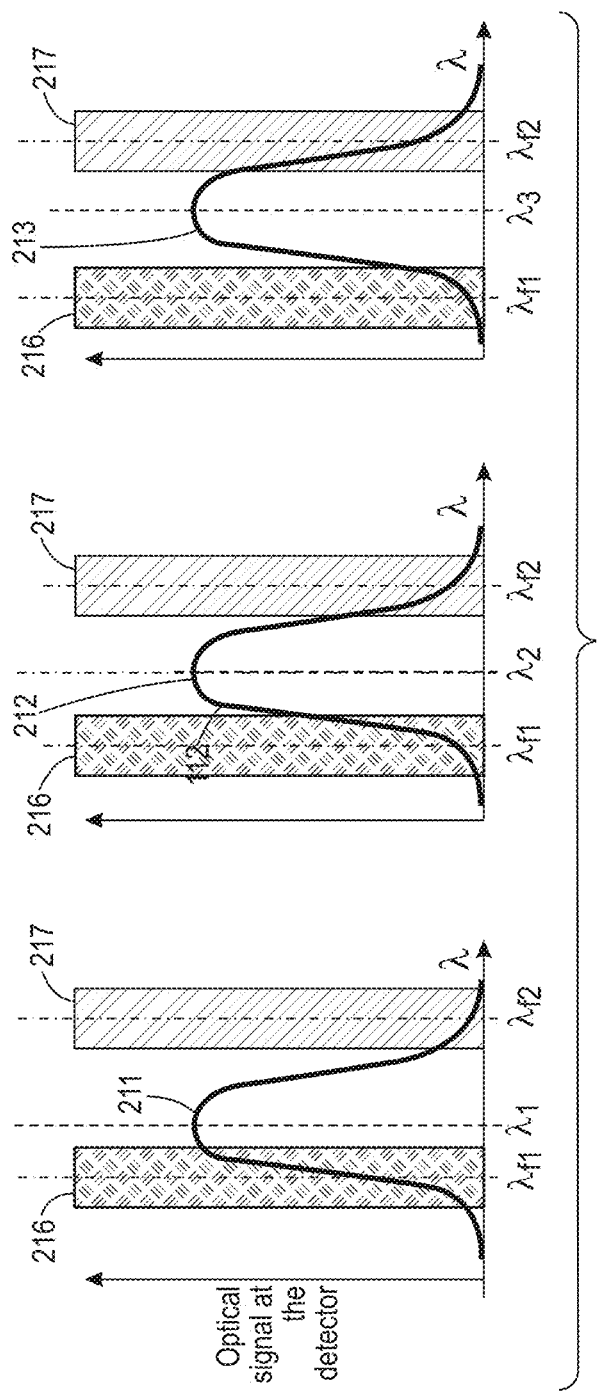

FIGS. 2B through 2D illustrate the operation of the Doppler imager 201 as the object 202 moves from left to right at constant velocity along the x axis. The object 202 moves toward the Doppler imager 201 past the position $x_1$, moves to the Doppler imager 201 at position $x_2$, and then moves away from the Doppler imager 201 past the position $x_3$. At time $t_1$, the object 202 is at position $x_1$; at time $t_2$, the object 202 is at position $x_2$, and; at time $t_3$, the object 202 is at position $x_3$. FIG. 2D provides graphs 223, 224 of the amplitude of detector outputs $I_1$ and $I_2$ with respect to position. Graph 223 shows the amplitude of electrical signal, $I_1$, of the first detector 208 and graph 224 shows the amplitude of the electrical signal, $I_2$, of the second detector 209.

As the object moves past position $x_1$ toward position $x_2$, the normalized output, I, is positive since $I_1 > I_2$ between $x_1$ and $x_2$. The normalized output, I, initially is positive and initially increases and then decreases as $I_1$ and $I_2$ converge at $x_2$. At position $x_2$, $I_1 = I_2$ and the normalized output is zero. As the object 202 moves past position $x_2$ toward position $x_3$, the normalized output becomes increasingly negative as $I_1$ and $I_2$ diverge and $I_2 > I_1$. Thus in this particular example, the sign of the normalized output, I, indicates the direction of object motion.

Figure 3A:
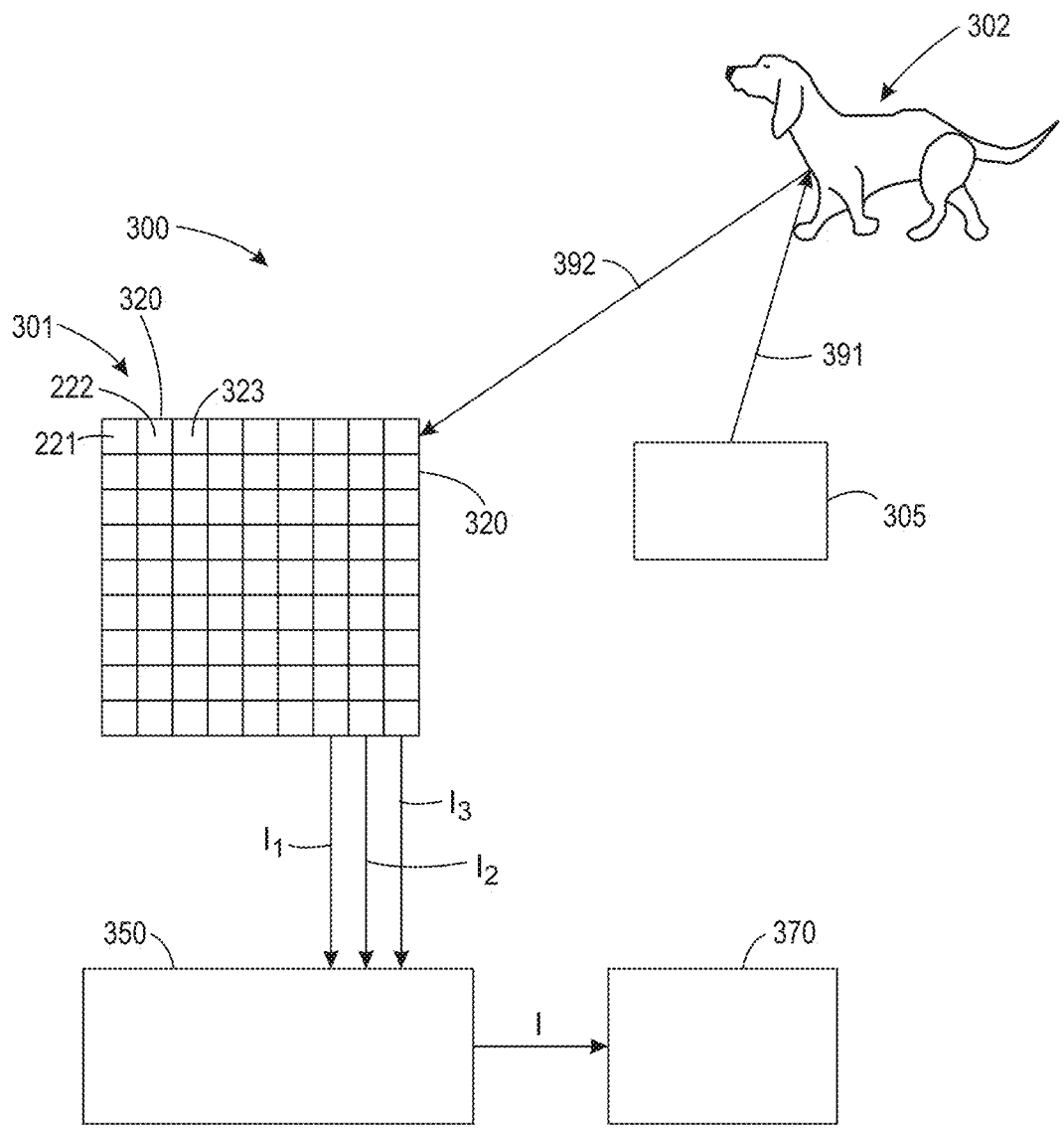
FIG. 3A is a block diagram depicting a Doppler imaging system in accordance with some embodiments.
Figure 3B:
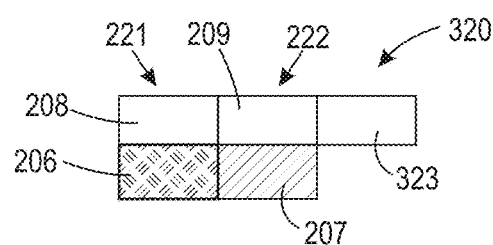
FIG. 3B is a side cross sectional view of one pixel of the Doppler imager of FIG. 3A.

FIG. 3A is a block diagram depicting a Doppler imaging system 300 in accordance with some embodiments. FIG. 3B is a side cross sectional view of one pixel 320 of the Doppler imager 301 of FIG. 3A. The embodiment of FIGS. 3A and 3B include first and second filter/detectors 221, 222 that may be configured as previously described with reference to FIGS. 2A through 2D. Each pixel 320 of the Doppler imager 301 also includes an additional detector 323 that receives unfiltered excitation light 392 that has been reflected by the object 302. The additional detector 323 generates a signal $I_3$ that is indicative of the reflectivity in response to sensing the unfiltered excitation light 323. For example, the signal $I_3$ can provide absolute reflectivity of the object 302. The signal $I_3$ can be used to adjust signals $I_1$, $I_2$ and/or I, to account for the reflectivity of the portion of the object imaged by the pixel 320.

Figure 4:
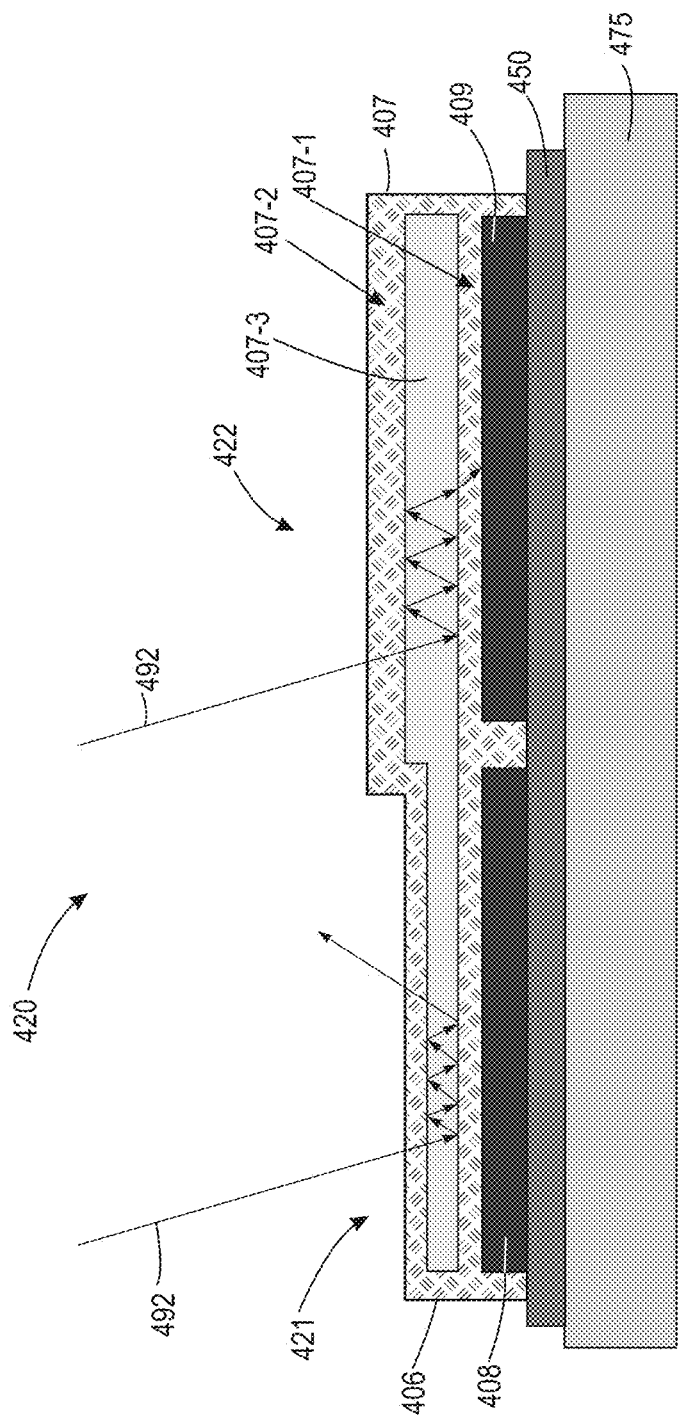
FIG. 4 is a side cross sectional view of one pixel of an integrated Doppler imaging device in accordance with some embodiments.

Chip-scale Doppler imagers that include at least two filter/detectors per pixel (as discussed with reference to FIGS. 2A through 2D), or one or more filter/detectors per pixel plus an additional unfiltered detector for absolute reflectivity (as discussed with reference to FIGS. 3A through 2C) can be fabricated on a wafer substrate as an integrated optoelectronic chip. FIG. 4 is a cross sectional diagram of an integrated Doppler imager pixel 420 in accordance with some embodiments. It will be appreciated that although only one pixel is shown in FIG. 4, the imager could include an array of pixels that collectively produce an image of the object. The chip-scale Doppler imager pixel 420 includes optical and electronic components fabricated on a substrate 475.

The integrated pixel 420 includes at least two optical filter/detectors 421, 422 arranged such that the first filter/detector 421 is adjacent to the second filter/detector 422. The first filter/detector 421 of a pixel 420 comprises a first filter 406 and a first detector 408. A second filter/detector 422 of a pixel 420 comprises a second filter 407 and a second detector 409. The first and second filters 406, 407 filter light 492 reflected by the object (not shown).

The first detector 408 is a photosensor arranged to detect reflected excitation light transmitted through the first filter 406. In response to the filtered reflected excitation light, the first detector 408 generates a first electrical output signal having an amplitude proportional to an overlap between the spectrum of the reflected excitation light 492 with the pass band of the first filter 406. The first electrical output signal is routed to the readout circuitry 450.

A second detector 409 is a photosensor arranged to detect reflected excitation light transmitted through the second filter 407. In response to the filtered reflected excitation light, the second detector 409 generates a second electrical output signal having an amplitude proportional to an overlap between a spectrum of the reflected excitation light 492 with the pass band of the second filter 408. The first and second filters 406, 407 may comprise Fabry-Perot filters. A Fabry-Perot filter includes first and second mirrors 407-1, 407-2, e.g., dielectric mirrors, that are separated by a cavity 407-3.

The first and second electrical output signals are routed to readout circuitry 450. The readout circuitry 450 can perform normalization of the first and second electrical output signals as previously discussed, and may perform other functions.

Although not shown in FIG. 4, the Doppler imager may also include an additional detector without an associated filter as previously discussed in connection with FIGS. 3A through 3C. The output of the additional detector may be useful to adjust the first and second detector outputs to account for reflectivity of the object.

A Doppler imager comprising an array of pixels 420 as discussed with reference to FIG. 4 could be custom designed and fabricated to provide differential wavelength shift signals from adjacent filter/detectors 421, 422. In some embodiments, the filter/detectors 421, 422 could be fabricated with integral bandpass filters 406, 407 with different center wavelengths. The different center wavelengths could be achieved during the semiconductor fabrication process by forming the cavity 407-3 in different discrete thicknesses using different lithographic masks and etch steps. Alternatively, a smoothly ramped thickness across two adjacent pixel/detectors could be fabricated using, for example, a combination of stepped etching of a photoresist followed by a heat driven reflow of the resist. Each pixel includes readout circuitry 450, that may be configured to directly output a normalized differential signal having background intensity removed. The readout circuitry 450 is shown to be part of the integrated device in FIG. 4, however, in some embodiments the readout circuitry would be separate but closely attached to the pixel. The differential signals generated by an array of pixels 420 could show relative motion between object and Doppler imager in an imagewise way. This approach may sacrifice some image resolution, but would be a low cost alternative in high volume manufacture.

The manufacturing process for the integrated device would be to use standard silicon or other semiconductor processing techniques, for example those used to produce silicon CMOS optical sensor arrays, to define the readout circuitry and the pixel sensors themselves. The fabrication process for the filters as outlined above would be achieved by subsequent lithographic, film deposition and etching steps to fabricate the appropriate layer configurations for each set of filters on top of the integrated circuit/sensor substrate. In some implementations, the fabrication could occur on a wafer scale, the integrated devices would subsequently be separated using conventional techniques, e.g. mechanical sawing, and then packaged in standard sensor packages such as used for CMOS optical sensors.

Suitable materials for the substrate include standard silicon, GaAs or GaInAs, for example. The Fabry-Perot cavities can be formed by photolithography or other semiconductor processing techniques on top of the substrate. The readout circuitry may comprise a combination of amplifiers optionally in addition analog-to-digital (A/D) converters, shift registers and/or on-board memory. The circuitry may be manufactured so that the circuitry connections come out to pads that can be be wire bonded or flip-chip mounted to a carrier and connected to the substrate.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:
1. A system comprising:
an imaging device comprising a two dimensional array of pixels, each pixel of the array comprising:
a first optical filter having a first pass band arranged to filter excitation light reflected by a moving object;
a first detector configured to detect light transmitted through the first optical filter and to generate a first electrical signal having an amplitude proportional to an overlap between a spectrum of the excitation light with the first pass band;
a second optical filter arranged to filter excitation light reflected by the moving object, the second optical filter having a second pass band different from the first pass band; and
a second detector configured to detect light transmitted through the second optical filter and to generate a second electrical signal having an amplitude proportional to an overlap between a spectrum of the excitation light with the second pass band; and
circuitry configured to generate output signals from the pixels, each output signal based on the first electrical signal and the second electrical signal of a pixel, the output signal including information about speed and direction of the moving object;
wherein the output signal comprises a difference between the first signal and the second electrical signal normalized by a sum of the first and second electrical signals.

2. The system of claim 1, wherein a sign of the output signal indicates a direction of the moving object.

3. The system of claim 1 wherein a rate of change of the output signal indicates a speed of the moving object.

4. The system of claim 1, wherein a full width half maximum (FWHM) of one or both of the first and second optical filters is less than a FWHM of the spectral range of the excitation light.

5. The system of claim 1, further comprising a third detector configured to detect light reflected by the moving object and to generate a third electrical signal, wherein the circuitry is configured to correct for reflectivity errors in one or both of the first and second signals based on the third electrical signal.

6. An integrated imaging device comprising:
a wafer substrate;
pixels of the integrated imaging device disposed on the substrate, each pixel comprising:
a first optical filter having a first pass band arranged to filter excitation light reflected by a moving object;
a first photosensor configured to detect light transmitted through the first optical filter and to generate a first electrical signal having an amplitude proportional to an overlap between a spectrum of the excitation light with the first pass band;
a second optical filter arranged to filter excitation light reflected by the moving object, the second optical filter having a second pass band different from the first pass band;
a second photosensor configured to detect light transmitted through the second optical filter and to generate a second electrical signal having an amplitude proportional to an overlap between a spectrum of the excitation light with the second pass band; and
electrical circuitry disposed on the substrate, the electrical circuitry configured to generate an output signal based on the first and second electrical signals, the output signal including information about speed and direction of the moving object, the electrical circuitry further configured to generate a differential signal based on the first and second electrical signals and generate a normalized differential signal based on the differential signal divided by a sum of the first and second electrical signals.

7. The integrated imaging device of claim 6, further comprising a third photosensor configured to detect light reflected by the moving object and to generate a third electrical signal.

8. The integrated imaging device of claim 7, wherein the circuitry is configured to correct for reflectivity errors in one or both of the first and second signals based on the third electrical signal.

9. The integrated imaging device of claim 6, wherein at least one of the first and second optical filters comprises a Fabry-Perot etalon filter.

10. The integrated imaging device of claim 6, wherein a full width half maximum (FWHM) of one or both of the first and second optical filters is less than a FWHM of the spectral range of the excitation light.

11. A method comprising:
optically filtering excitation light reflected by a moving object using at least one first optical filter having a first pass band;
sensing light transmitted through the first optical filter and generating at least one first electrical signal having an amplitude proportional to an overlap between a spectrum of the excitation light with the first pass band;
optically filtering the excitation light reflected by a moving object using at least one second optical filter having a second pass band;
sensing the light transmitted through the second optical filter and generating at least one second electrical signal having an amplitude proportional to an overlap between a spectrum of the excitation light with the second pass band; and
generating at least one output signal based on a difference between the first electrical signal and the second electrical signal; and
determining speed and direction of the moving object based on the output signal;
wherein the output signal is a differential signal and the differential signal is normalized by a sum of the first and second electrical signals.

12. The method of claim 11, further comprising:
sensing unfiltered light reflected by the moving object;
generating a third electrical signal having an amplitude corresponding to the unfiltered light; and
correcting for reflectivity errors in the output signal based on the third electrical signal.

13. The method of claim 11, wherein a sign of the output signal indicates a direction of the moving object.

14. The method of claim 11, wherein a rate of change of the output signal indicates a speed of the moving object.

* * * * *